UNITED STATES PATENT OFFICE 1,995,063

STABILIZATION OF HYDROGEN PEROXIDE SOLUTIONS

Charles Roberts Harris and John Louis Fahs, Niagara Falls, N. Y., assignors to E. I. du Pont de Nemours & Company, Inc., Wilmington, Del., a corporation of Delaware No Drawing. Application October 21, 1932, Serial No. 638,916

14 Claims. (Cl. 23—251)

This invention relates to a method for the stabilization of hydrogen peroxide solutions.

Various substances, for instance organic amino compounds, tannic, benzoic, salicylic, sulfanilic, phthalic, barbituric, and gallic acids, cinchonidine, p-acetylaminophenol, gums, alcohols, alumina and metallic compounds, have been proposed as stabilizers for hydrogen peroxide solutions. It likewise has been shown that certain methods of purification produce a solution which possesses increased stability. However, some of the proposed stabilizers possess disadvantages for although they may effect temporary stability of the hydrogen peroxide they are not satisfactory for stabilizing the solution for long time periods, for instance one year. Likewise some stabilizers either introduce an objectionable deposit or impart color to the solution being stabilized. In such cases the presence of color or a precipitate detracts from the value of the product.

This invention has as an object the stabilization of hydrogen peroxide solutions. A further object is the addition of substances to hydrogen peroxide solutions which retards decomposition for long periods of time, and which imparts neither color nor insoluble residue to the solution. Other objects will appear hereinafter.

These objects are accomplished by the addition of small amounts of hydroquinone, or one of its derivatives, to the hydrogen peroxide solution. The stabilizer is added in amounts equal to from 0.001 to 0.1% of the total weight of the hydrogen peroxide solution, with a preferred concentration of from 0.01 to 0.02%.

By hydroquinone derivative we mean any compound consisting of a benzene ring with hydroxy groups in the para positions, with one or more of the nuclear hydrogen atoms substituted by other elements or groups of elements. Examples of this class of compounds are: chlorhydroquinones, bromhydroquinones, hydroxy hydroquinones, and hexahydroxy benzene.

The following example serves to illustrate some methods of practicing our invention:

Example

To separate samples of a 30% hydrogen peroxide solution—about 0.02% by weight of hydroquinone, chlorhydroquinone, and bromhydroquinone were added. These samples were stored in clear glass unstoppered bottles covered with glass beakers to exclude dust, for various periods of time in a place where they were exposed to diffused daylight at room temperature. At the end of their respective storage periods, the samples were analyzed to determine hydrogen peroxide decomposition. The results obtained were as follows:

| Stabilizer | Storage time | $H_2O_2$ decomposed (% by weight) |
|---|---|---|
| Hydroquinone | 340 days | 0.38% |
| Chlorhydroquinone | 164 days | Less than 1% |
| Bromhydroquinone | 67 days | Not detectable |

Certain advantages are obtained by the use of our stabilizers over those previously used. The amount of foreign matter introduced by our stabilizer is so small that it would not be likely to interfere with any uses for which the peroxide might be required; hydroquinone is completely miscible with hydrogen peroxide in the proportions used, and no insoluble precipitate is formed, as with the use of certain inorganic stabilizers. By the use of this new class of stabilizers it is possible to store hydrogen peroxide solutions for prolonged periods with minimum decomposition, and with little if any harmful effects upon the value of the product.

In the appended claims, the term "para-dihydroxy benzene compound" is used to designate hydroquinone and any derivative thereof having para-hydroxyl radicals, as hereinbefore defined.

We claim:

1. The method of stabilizing a hydrogen peroxide solution comprising adding thereto a para-dihydroxy benzene compound in stabilizing amounts.

2. The method of stabilizing a hydrogen peroxide solution comprising adding thereto stabilizing amounts of hydroquinone.

3. The method of stabilizing a hydrogen peroxide solution comprising adding thereto 0.001–0.1% by weight of a para-dihydroxy benzene compound.

4. The method of stabilizing a hydrogen peroxide solution comprising adding thereto from 0.001 to 0.1% by weight of hydroquinone.

5. The method of stabilizing a hydrogen peroxide solution comprising adding thereto from 0.001 to 0.1% by weight of a hydroquinone derivative.

6. The method of stabilizing a hydrogen peroxide solution comprising adding thereto about 0.02% by weight of a hydroquinone derivative.

7. The method of stabilizing a hydrogen peroxide solution comprising adding thereto about 0.02% by weight of hydroquinone.

8. A composition of matter comprising a hydrogen peroxide solution containing stabilizing amounts of a paradihydroxy benzene compound.

9. A composition of matter comprising a hydrogen peroxide solution containing stabilizing amounts of hydroquinone.

10. A composition of matter comprising a hydrogen peroxide solution containing stabilizing amounts of a hydroquinone derivative.

11. A composition of matter comprising a hydrogen peroxide solution containing 0.001–0.1% of hydroquinone.

12. A composition of matter comprising a hydrogen peroxide solution containing 0.001–0.1% of a hydroquinone derivative.

13. A composition of matter comprising a hydrogen peroxide solution containing about 0.02% of hydroquinone.

14. A composition of matter comprising a hydrogen peroxide solution containing about 0.02% of a hydroquinone derivative.

CHARLES ROBERTS HARRIS.
JOHN LOUIS FAHS.